United States Patent [19]

Nadkarni

[11] 4,110,130

[45] Aug. 29, 1978

[54] FORGING POWDERED DISPERSION STRENGTHENED METAL

[75] Inventor: Anil Vasant Nadkarni, Pasadena, Md.

[73] Assignee: SCM Corporation, New York, N.Y.

[21] Appl. No.: 727,890

[22] Filed: Sep. 29, 1976

[51] Int. Cl.² .............................................. B22F 3/12
[52] U.S. Cl. .................... 148/11.5 P; 75/226
[58] Field of Search ................. 148/11.5 P; 75/226

[56] References Cited

U.S. PATENT DOCUMENTS

| | | | |
|---|---|---|---|
| 3,205,099 | 9/1965 | Vordahl | 148/11.5 P |
| 3,346,427 | 10/1967 | Baldwin, Jr. | 148/11.5 P |
| 3,403,058 | 9/1968 | Pollock | 148/11.5 P |
| 3,861,966 | 1/1975 | Scheithauer, Jr. | 148/11.5 P |

*Primary Examiner*—W. Stallard
*Attorney, Agent, or Firm*—Thomas M. Schmitz

[57] ABSTRACT

Welding electrodes and welding wheels can be hot forged from powdered dispersion strengthened metal wherein the powder is pressed into a preform, heated, and then hot forged to form a full density workpiece to produce a desirable grain structure.

1 Claim, 7 Drawing Figures

FORGING POWDERED DISPERSION STRENGTHENED METAL

BACKGROUND OF THE INVENTION

This invention pertains to a process for forging dispersion strengthened powdered metal to form full density workpieces.

Dispersion strengthened metal products, such as copper dispersion strengthened with aluminum oxide, have many commercial and industrial uses wherein high temperature strength properties and high electrical and/or thermal conductivities are desired or required in the finished product. Welding electrodes for example require good electrical and thermal conductivities together with good strength and hardness at elevated temperatures.

Dispersion strengthening has been recognized in the past as a method for increasing strength and hardness of metals. A solid solution alloy comprising a relatively noble matrix metal having relatively low heat or free energy of oxide formation and a solute metal having relatively high negative heat or free energy of oxide formation can be dispersion strengthened by heating the alloy under oxidizing conditions to preferentially oxidize the solute metal. This technique of oxidizing the solute metal to a solute metal oxide is known in the art as in situ internal oxidation or more simply internal oxidation.

Several processes for internal oxidation have been suggested, such as disclosed in the Schreiner patent, U.S. Pat. No. 3,488,185; the McDonald patent, U.S. Pat. No. 3,552,954; the Grant patent, U.S. Pat. No. 3,179,515; as well as commonly assigned U.S. Pat. No. 3,779,714 and incorporated herein by reference. U.S. Pat. No. 3,779,714 provides an improved alloy-oxidant mixture wherein the oxidant includes an oxide which releases oxygen to oxidize the solute metal of the alloy. The oxidant further includes a hard refractory oxide which is particularly adapted to dispersion strengthen the residue during thermal coalescence. The oxidant residue formed during internal oxidation is not required to be removed from the dispersion strengthened metal but rather is dispersion strengthened by the hard, refractory metal oxide during coalescence to form an integral part of the dispersion strengthened metal stock. A further improvement is set forth in commonly assigned U.S. Pat. No. 3,893,844 which provides improved dispersion strengthened metals by first recrystallizing the alloy powder prior to internal oxidation to increase the grain size of the alloy to a grain size at least as large as Grain Size No. 6 as measured by ASTM Test No. E-112.

Dispersion strengthened metal powders are ordinarily consolidated under heat and pressure such as by extrusion at temperatures usually above about 1400° F. wherein the extrudate emerges from the extrusion press typically in cylindrical bar stock which then can be cold drawn and machined to the desired configuration of the workpiece. Extrusion tends to produce an anisotropic fibered grain structure in the axial direction which tends to produce a lower hot strength transverse to the axis. Commonly assigned application Ser. No. 598,844 filed July 24, 1975 provides a method of increasing the strength of extruded products by pressure forming with axially applied pressure to reorientate the coaxial fiber structure and form isotropic grain structure in the workpiece.

It now has been found that substantially improved dispersion strengthened metal products can be produced directly from powdered dispersion strengthened metal by first compacting the powder into a preform followed by hot forging the preform to substantially full density whereby the hot forged metal parts at full density have an isotropic grain structure and uniform strength in all directions.

These and other advantages will become more apparent by referring to the drawings and the detailed description of the invention.

SUMMARY OF THE INVENTION

Resistance welding electrodes and similarly formed products can be produced directly from dispersion strengthened metal powder by first forming the powder into a compacted preform of about 80% to 90% theoretical full density followed by hot forging of the compacted preform into a specifically formed metal product of substantially full density.

IN THE DRAWINGS

FIG. 1 is a photomicrograph, enlarged 100 times, of the microstructure of a powdered metal forged product in accordance with this invention; and FIGS. 2($a + b$), 3($a + b$) and 4($a + b$) show graphs of comparative test results of welding electrodes forged in accordance with this invention and compared to electrodes made from Class II Standard Mallory 3 material.

DETAILED DESCRIPTION OF THE INVENTION

Figure 1:
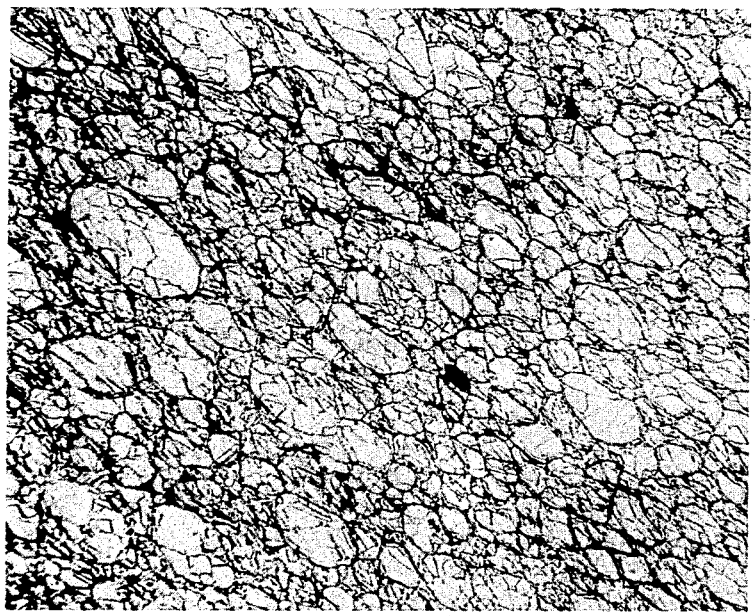

Referring first to the drawings, FIG. 1 is a photomicrograph, enlarged 100 times, showing the isotropic grain structure of a resistance welding electrode produced in accordance with this invention from dispersion strengthened copper alloy powder containing 0.66% by weight aluminum oxide as more particularly set forth in Example I. The photomicrograph of FIG. 1 was taken in a plane longitudinal to the direction of hot forging and indicates that the grain structure is substantially isotropic.

Figure 2A:
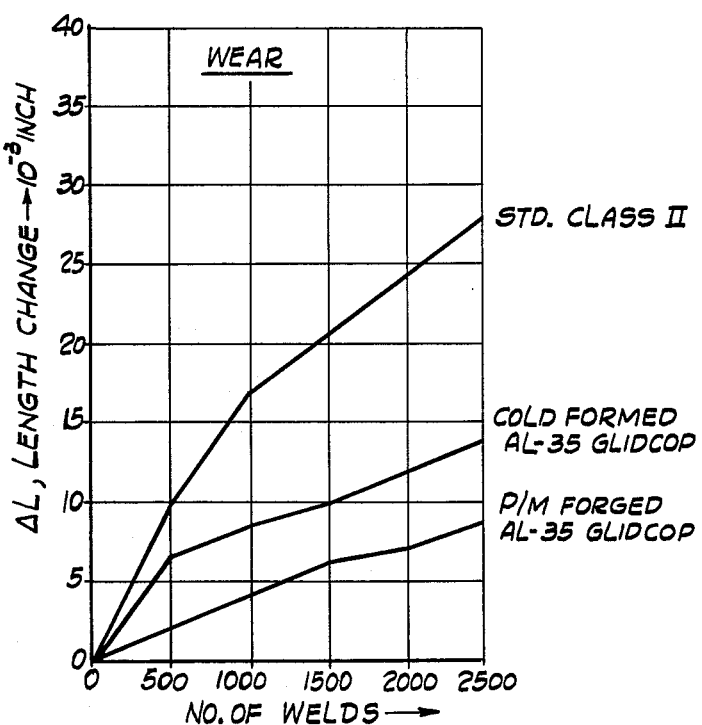
Figure 2B:
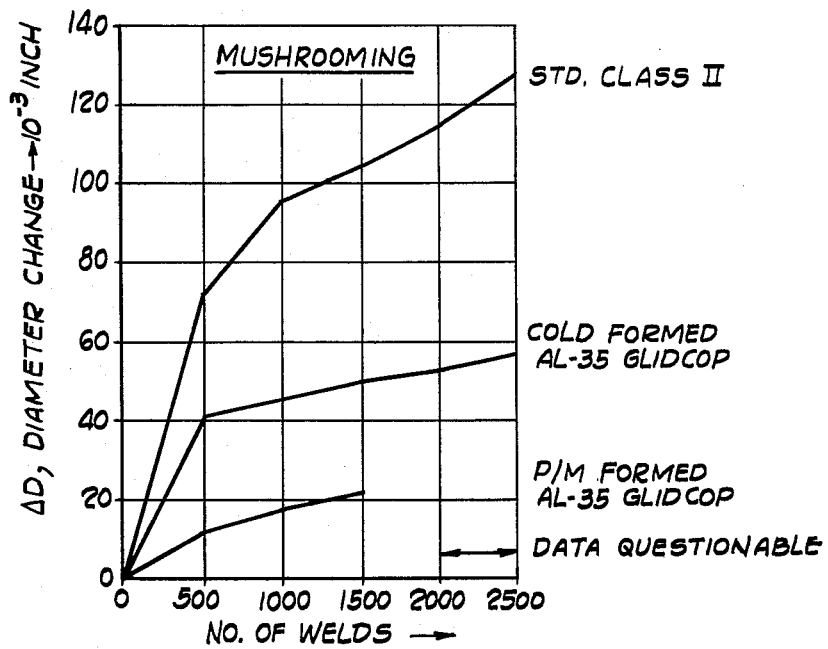
Figure 3A:
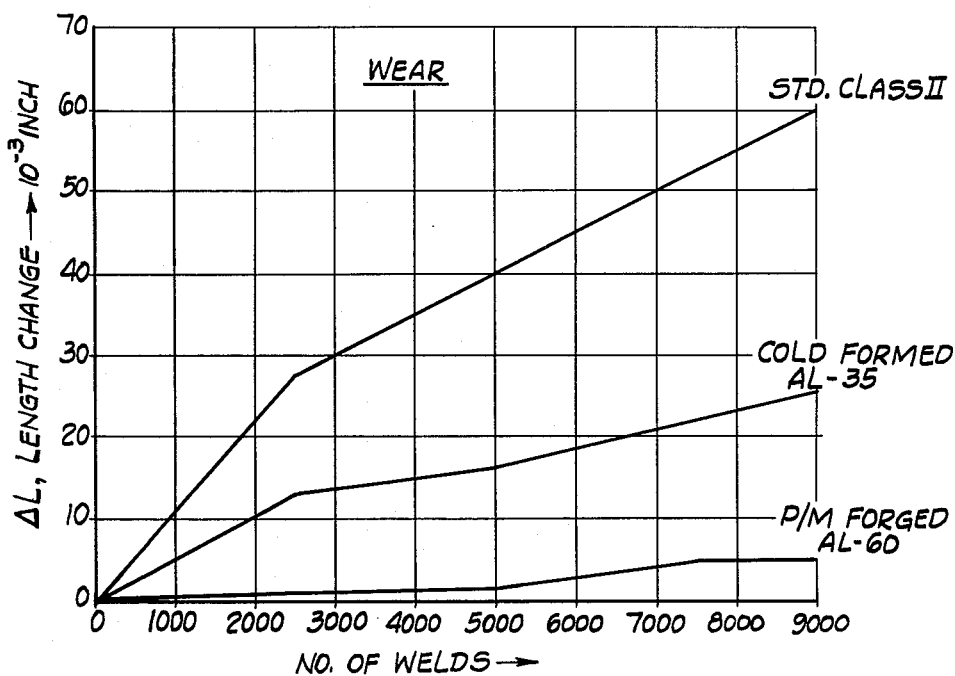
Figure 3B:
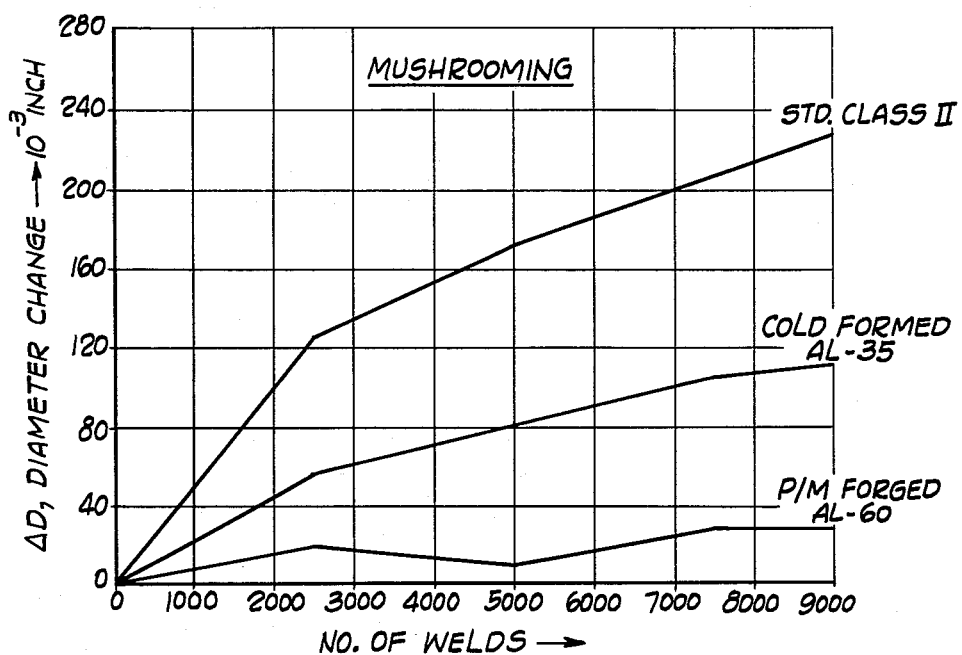

FIGS. 2($a$) and ($b$) show a graph of comparative test results of welding electrodes of this invention compared to Class II Standard Mallory 3 electrodes as well as cold formed electrodes made from extruded dispersion strengthened copper as set forth in commonly assigned Ser. No. 598,844 (filed July 24, 1975) and further described in Example I. FIGS. 2($a$) and ($b$) indicate that changes in length and diameter respectively increase with the number of welds wherein greater changes in dimensions are undesirable and indicate less wear resistance of the material. Powdered dispersion strengthened metal hot forged into full density electrodes in accordance with this invention are shown as the lowermost curves in FIGS. 2($a$) and ($b$) indicating electrodes of this invention are comparatively the most wear resistant. Similarly FIGS. 3($a$) and ($b$), and 4($a$) and ($b$) show the same kind of superior performance by powder forged electrodes made in accordance with this invention and as more particularly described in the examples. Dispersion strengthened metal powder is ordinarily less than about 300 microns and can be produced by internal oxidation preferably in accordance with commonly assigned U.S. Pat. No. 3,779,714 and U.S. Pat. No. 3,873,844. The heat treated dispersion strengthened metal powder is first pressed into a compacted preform at ambient temperatures in a conventional confined die assembly to produce a compacted powder preform of about 80–90% of theoretical density and broadly between about 75–95% of theoretical full density. The compacted preform is preferably coated with a thick graphite paste or other suitable material to reduce oxidation of the dispersion strengthened metal in the subsequent hot forging process. The graphite coated preform is heated in a furnace under preferably a neutral or reducing atmosphere to a temperature of at least about 1400° F. and preferably between about 1600° F. and 1700° F. for dispersion strengthened copper. The heated compacted preform is then hot forged in accordance with this invention into a substantially full density dispersion strengthened metal workpiece of at least about 98% of theoretical full density and preferably above 99% of theoretical full density. The compacted preform can be a small size slug that is hot forged into a larger diameter workpiece of full density. The hot forging preferably provides substantial lateral flow of material which efficiently scrapes the surface oxides from the dispersion strengthened powdered metal particles thereby improving the bonding between adjacent metal particles. The process is particularly suitable for dispersion strengthened metals since the starting material is a powder and provides a substantial improvement over RWMA standard class materials. The advantages and improvements realized are further illustrated by the following examples.

EXAMPLE I

Comparative electrodes A, B, and C were made as follows:

A. The powder was dispersion strengthened copper alloy containing 0.66% by weight aluminum oxide and was made by internally oxidizing a Cu-0.35% Al alloy at 1750° F. for one hour in the presence of an oxidant. Heat treated powder was then first pressed into a ½ inch diameter × 1¾ inch long compacted preform in a conventional confined die assembly to produce a compacted preform of about 90% theoretical density. The preform was coated with thick graphite paste to reduce oxidation during heating. The coated preform was then heated to 1700° F. in a furnace for 20 minutes in a neutral atmosphere and then hot forged into a fully dense slug ⅜ inch in diameter and 1 inch long. Starting from a smaller diameter preform and forging to a longer diameter electrode slug is desirable in that it provides substantial lateral flow of material during forging. The shearing action resulting from such flow helps in stripping surface oxides on the powder particles and allowing better bonding between particles. The electrode was made by machining a truncated cone welding tip (¼ inch diameter working face, 60° included angle) from the fully dense hot forged ⅜ inch diameter slug. Two electrodes, a bottom electrode and top electrode, were tested as a pair under the following conditions:

Sheet test materials

Top: SAE 1010 Bare Steel
Bottom: SAE 1010 Bare Steel

Sheet thickness (inch)

Top: 0.044
Bottom: 0.044

The sheet materials were lapped and welded together by test welds under operating conditions as follows:

Weld current, amps: 8500
Weld force, pounds: 650
Weld time, cycles: 30
Squeeze time, cycles: 15
Hold time, cycles: 10
Off time, cycles: 15
Weld rate, No./min.: 32

The electrode lengths and working face diameters were measured at the beginning of the test and at 500 weld intervals. The changes in length represent wear of the electrodes and increases in diameter represent mushrooming. The wear on both test electrodes was approximately the same and the results are shown in Table 1 as well as FIGS. 2(a) and (b).

B. Electrodes similar to A were produced from the same dispersion strengthened copper powder which was extruded, cold drawn and then cold forged with axial applied pressure to pressure flow the welding tip into a truncated cone welding tip having an isotropic grain structure in accordance with a method set forth more particularly in commonly assigned Ser. No. 598,844 filed July 24, 1975. Pressure was applied axially to an elongated electrode blank whereupon the blunt tip pressure flowed into a truncated cone welding tip in conformance with the die.

C. Standard RWMA Class II material (Mallory 3) was cut into blank electrode stock which was machined to produce a truncated cone welding tip. The material composition was approximately 99% copper and 1% chormium.

TABLE 1

| | Length "l" (inches) | | | Diameter "d" (inches) | | |
|---|---|---|---|---|---|---|
| No. of Welds | "C" | "B" | "A" | "C" | "B" | "A" |
| 0 | 1.995 | 1.997 | 0.845 | 0.254 | 0.249 | 0.250 |
| 500 | 1.985 | 1.990 | 0.843 | 0.327 | 0.290 | 0.263 |
| 1000 | 1.978 | 1.988 | 0.831 | 0.350 | 0.295 | 0.269 |
| 1500 | 1.975 | 1.987 | 0.839 | 0.358 | 0.300 | 0.272 |
| 2000 | 1.971 | 1.985 | 0.838 | 0.370 | 0.302 | 0.260 |
| 2500 | 1.967 | 1.983 | 0.836 | 0.381 | 0.306 | 0.260 |

EXAMPLE II

Similar to Example I, electrodes A and C were made as follows:

A. The powder was dispersion strengthened copper alloy containing 1.13% by weight aluminum oxide and was made by internally oxidizing a Cu-0.60% Al alloy at 1750° F. for one hour in the presence of an oxidant. The heat treated powder was then made into electrodes and evaluated in the manner described in Example I. The results of these tests are shown in Table 2 as well as FIGS. 3(a) and (b).

C. Standard RWMA Class II electrodes were the same as electrodes "C" in Example I.

TABLE 2

| | Length "l" (inches) | | Diameter "d" (inches) | |
|---|---|---|---|---|
| No. of Welds | "A" | "C" | "A" | "C" |
| 0 | 0.886 | 1.995 | 0.250 | 0.254 |
| 2,500 | 0.885 | 1.967 | 0.270 | 0.381 |
| 5,000 | 0.884 | 1.955 | 0.260 | 0.428 |
| 7,500 | 0.881 | 1.942 | 0.275 | 0.462 |
| 9,000 | 0.881 | — | 0.275 | — |
| 10,000 | — | 1.932 | — | 0.493 |

The wear characteristics of dispersion strengthened copper electrodes of this invention are substantially superior (smaller changes in electrode length) to the standard RWMA Class II electrodes. More importantly, the dispersion strengthened copper electrodes of this invention exhibit remarkable resistance to mushrooming (smaller changes in electrode face diameter) compared to standard RWMA Class II electrodes.

EXAMPLE III

Electrodes A and C were produced as follows:

A. The powder was dispersion strengthened copper alloy containing 1.13% by weight aluminum oxide and was made by internally oxidizing a Cu-0.60% Al alloy at 1750° F. for one hour in the presence of an oxidant. The heat treated powder was made into electrodes in the same manner as electrodes "A" in Example I with the exception that the electrode nose was dome shaped instead of truncated cone. A pair of these dome shaped electrodes was tested under the following welding conditions:

Sheet test materials

Top: SAE 1010 Bare Steel
Bottom: SAE 1010 Galvanized Steel

Sheet thickness (inch)

Top: 0.075
Bottom: 0.080

Weld Current, amps: 13,000
Weld Force, pounds: 1,300
Weld Time, cycles: 16
Squeeze Time, cycles: 84
Hold Time, cycles: 100
Off Time, cycles: 100
Weld Rate, no./min.: 12

The electrode lengths and working face diameters were measured at the beginning of the test and at 500 weld intervals.

C. Standard RWMA Class II material was cut into blank electrode stock which was machined to produce a conventional pointed nose electrode used in the automotive industry.

Figure 4A:
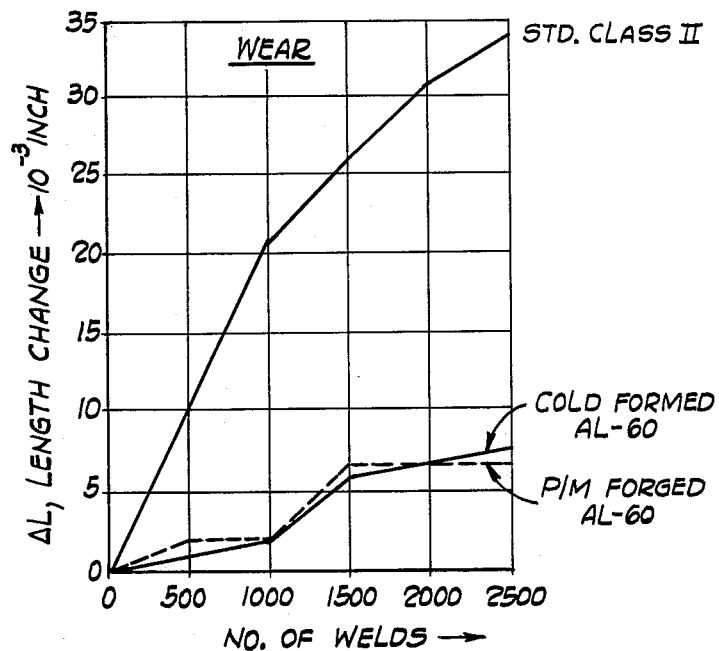
Figure 4B:
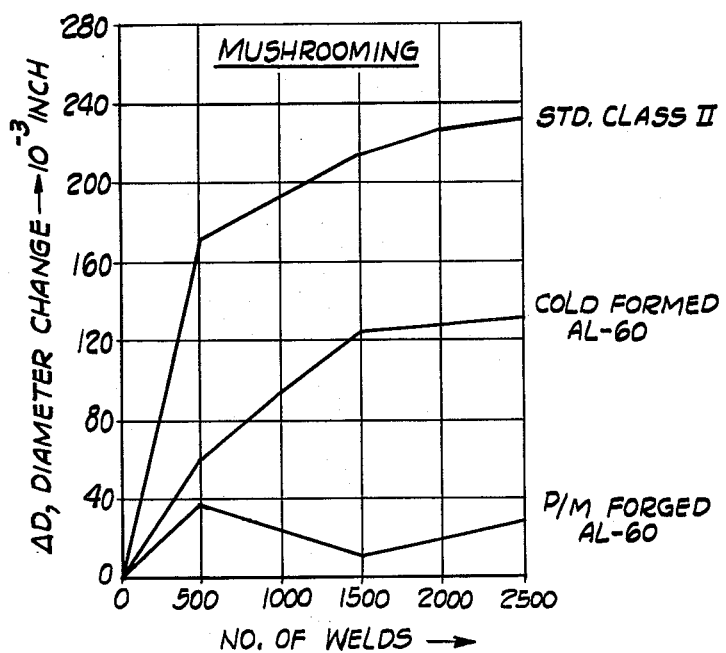

The comparative test results on "A" and "C" electrodes of this example are shown in Table 3 and FIGS. 4(a) and (b).

TABLE 3

|  | Length "l" (inches) | | Diameter "d" (inches) | |
| --- | --- | --- | --- | --- |
| No. of Welds | "A" | "C" | "A" | "C" |
| 0 | 0.881 | 0.849 | 0.250 | 0.240 |
| 500 | 0.879 | 0.839 | 0.288 | 0.413 |
| 1,000 | 0.879 | 0.828 | 0.274 | 0.435 |
| 1,500 | 0.874 | 0.823 | 0.260 | 0.455 |
| 2,000 | 0.874 | 0.818 | 0.270 | 0.468 |
| 2,500 | 0.874 | 0.815 | 0.280 | 0.472 |

Once again the dispersion strengthened copper electrodes of this invention exhibit remarkably superior resistance to wear and mushrooming compared to standard RWMA Class II electrodes.

EXAMPLE IV

Seam welding wheels were made from dispersion strengthened copper powders by forming preforms followed by hot forging. In industry the wheels range in size from a couple of inches in diameter to 24 inches or more.

A. Dispersion strengthened copper powder was enclosed in a 1½ inch diameter × 1 inch long copper container, heated at 1700° F. in argon, and hot forged between two flat plates to a disc having a maximum diameter of 2¾ inch and 0.278 inch thickness. The density of the forged disc was determined to be 99.3% of theoretical density. The hardness profile of the formed disc showed uniform hardness of between 76 and 77 RB across a major portion of the disc surface. The drop in hardness at the periphery (obtained after removing the copper can by machining) is an indication of incomplete densification in the area immediately adjacent to container wall which was removed by machining.

B. Dispersion strengthened copper powder was enclosed in 8 inches diameter × 6 inches long mild steel containers, heated at 1700° F. in air, and hot forged on forging hammer to wheels having 13 inches diameter and 1½ inches thickness. The surface hardness profile along a diameter was uniform over 10 inches with average hardness of 67 RB, except for the rim around the periphery which had hardness drop indicating incomplete densification immediately adjacent to the container walls.

The foregoing examples establish the substantial improvement of hot forging a powder preform to full density to provide excellent wear resistant spot welding electrodes and seam welding wheel electrodes, but are not intended to be limiting except as defined in the appended claims.

I claim:

1. A two-step process for producing a dispersion strengthened metal product having substantially an isotropic grain structure and produced from dispersion strengthened metal powder having an average particle size less than about 300 microns, the process comprising:

cold forming from said metal powder a preform having a density of between 80% to 90% of the theoretical full density of said product;

coating the preform with graphite lubricant and hot forging said preform at temperatures above about 1400° F. to form substantially a full density product having a density of at least 98% of the theoretical density, said product having substantially an isotropic grain structure.

* * * * *